Dec. 3, 1968 C. B. STOKER, JR Re. 26,494

PACKAGE

Original Filed April 16, 1964 2 Sheets-Sheet 1

INVENTOR.
CARL B. STOKER, JR.
BY
J. B. Holden
ATTORNEY

PACKAGE

Original Filed April 16, 1964 2 Sheets-Sheet 2

INVENTOR.
CARL B. STOKER, JR.
BY
J. B. Holden
ATTORNEY

United States Patent Office

Re. 26,494
Reissued Dec. 3, 1968

26,494

PACKAGE

Carl B. Stoker, Jr., Akron, Ohio, assignor to The Goodyear Tire & Rubber Company, Akron, Ohio, a corporation of Ohio Original No. 3,246,745, dated Apr. 19, 1966, Ser. No. 360,250, Apr. 16, 1964. Application for reissue Apr. 20, 1967, Ser. No. 641,059
8 Claims. (Cl. 206—65)

Matter enclosed in heavy brackets [ ] appears in the original patent but forms no part of this reissue specification; matter printed in italics indicates the additions made by reissue.

*ABSTRACT OF THE DISCLOSURE*

*A skin package is provided by placing material to be packaged between a backing through which a vacuum can be drawn and a thermostretchable and heat-sealable film, and then by heating the film and drawing a vacuum through the backing, the film is stretched over the backing and heat sealed thereto. The backing is then shaped to enclose the article.*

This invention relates to a new type of skin package, designed especially for packaging frangible articles. The article or articles may be packaged on a flat perforated backing, or they may be packaged against the perforated bottom of a box.

If a flat backing is used, this backing to which the article or articles are fastened by a film covering is relatively rigid and encompasses the one or more articles within the package and protects them from being crushed. The one or more articles are not only held tight against a relatively stiff backing so that they do not rattle around within the package, but, in addition, this relatively stiff backing encompasses them giving them additional protection, which is of particular importance in the packaging of frangible articles.

The backing must be self-supporting, the degree of its rigidity depending upon the type of package. It may be absolutely rigid, or it may be flexible under more or less pressure. For instance, the backing in a package for electric light bulbs, which is to be shipped with many other similar packages in a large container, may be quite flexible but affords sufficient protection to prevent the bulb or bulbs from being broken if dropped by the ultimate purchaser when carried from the retail outlet to the place of use. On the other hand, the backing in a container for the shipment of a set of glass dishes will be very rigid. It will be made of very stiff carton stock, or a stiff plastic, or even metal or the like.

This backing is perforated *or otherwise porous,* as is customary in skin packages, and the film is adhered to the inner surface of it. The film is flexible when heated during the formation of the package and is heat sealable. After cooling, it may remain flexible or it may harden. It is also thermostretchable but has constant dimensions at normal temperatures. Suitable films include rubber hydrochloride film, vinyl films, etc.

The one or more articles are fastened to the backing by first placing them on the backing. The film is placed over them. Then heat is applied. This causes the film to become limp and it drapes itself over and around the articles. It is large enough to completely cover the one or more articles and to make contact with the backing in the area around the articles. The heat also is sufficient to make the film sealable and stretchable. By suction applied under the backing the air in the space under the film is evacuated through the perforations in the backing. This stretches the film tight over each of the one or more articles and it is drawn to the backing all around each article and sealed to it. This is customary in the process of skin packaging.

The backing in such a package encompasses the one of more articles within the package, and protects them.

If the one or more articles are packaged in a box, the bottom is perforated. The sides may also be perforated, but this is not necessary unless one or more articles are to be fastened to the sides. Generally, the article or articles will be fastened to only the bottom of the box. The film is held across the top of the box. This may be facilitated by placing the box in an indentation in which generally it makes a relatively snug fit. In this method it is not necessary that the walls of the box be stiff enough to hold up under the force of the vacuum as it draws the film down into the box. Alternatively, many rectangular boxes may be placed touching one another, and a single film may be placed over all of them and then drawn down into all of them simultaneously.

When a box is used, it is placed on a surface with openings in it through which a vacuum is drawn, and the film is stretched down into the box, over the article or articles, and is sealed to the surrounding inner surface of the box. It is sealed against the inner surface of the walls. If many boxes are used, adjacent one another, after the article or articles have been fastened in the box in this manner, the film is cut between the various boxes to separate them, and suitable tops are put on the boxes.

The invention is described more fully in connection with the accompanying drawings, in which—

Figure 6:
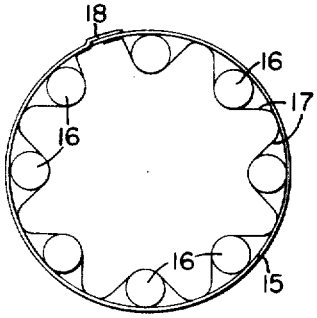
FIGURE 6 is a view of the same after the backing has been formed into a cylinder.
Figure 5:
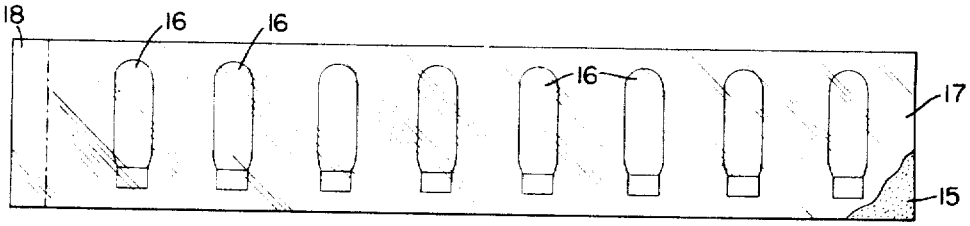
FIGURE 5 is a plan view of many frangible articles attached to a strip of relatively flexible backing.
Figure 7:
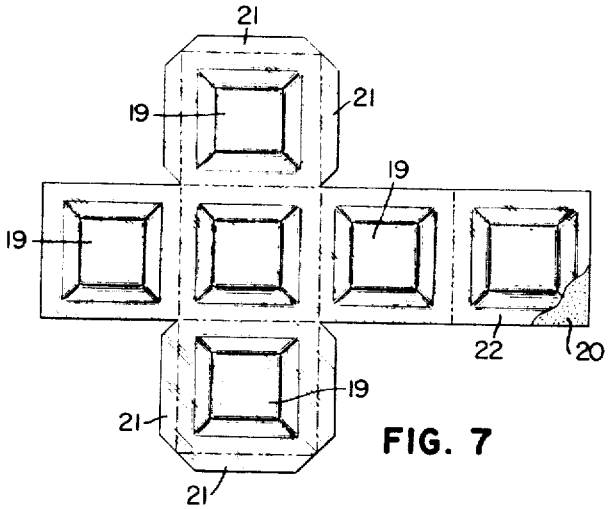
FIGURE 7 is a plan view of quite rigid backing from which a box is to be formed with a frangible article on the inner surface of each side of the box.
Figure 8:
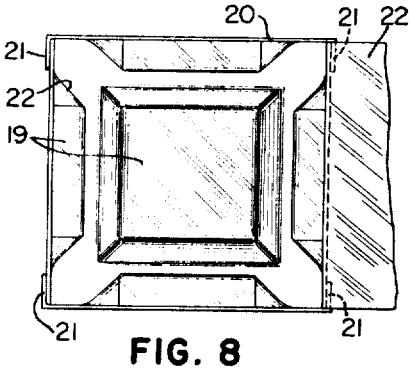
FIGURE 8 is an end view of the assembled box before closing the top.

The article to be packaged may be of any shape. FIGURES 1–4 illustrate the packaging of a television tube; FIGURES 5 and 6 illustrate the packaging of elongated electric light bulbs; FIGURES 7 and 8 illustrate the packaging of the flat boxes; FIGURES 9 to 12 illustrate the packaging of an article in a box.

The invention, as illustrated in FIGURES 1 to 8, is designed for packaging any number of frangible articles skin-packaged against backing which is sufficiently rigid to give added protection, as required. When several articles are packaged together, the articles need not all be identical, although ususally that will be the case. If identical, the articles need not all be laid out parallel to one another all pointing in one direction, but they may be arranged as desired.

Figure 1:
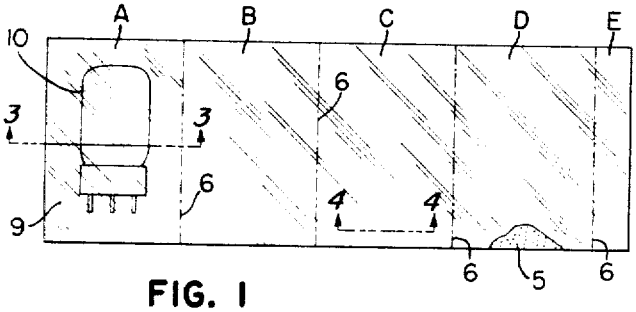
FIGURE 1 is a plan view of a sheet of quite rigid backing designed to be folded into a rectangular package, and shows a single frangible article held to the sheet by film which is stretched over it.

The principle of skin-packaging is well known. The perforated backing 5 of FIGURE 1 is divided into five rectangular panels A, B, C, D and E by the score lines 6. The panel E is a narrow panel and serves as a flap in forming the package. For convenience the whole of the backing 5 will be perforated by small perforations 7 (FIGURE 4) and ususally a surface coating 8 of a heat-sealable material will be provided. However, only the portion of the backing which is covered by the film need be perforated or have a heat-sealable surface. The film 9 is adhered to the surface coating 8 around the packaged article.

In forming the package, the backing 5 is laid out flat. The television tube 10 is placed on it. Then the film 9 is laid over the tube and heat is applied from above, as by radiant heat, to render the film stretchable and heat sealable. The vacuum is applied to the undersurface of the portion of the backing covered by the film. Although generally the film will cover the entire surface of the backing, as shown, it may cover only the panel A. The film is stretched around the tube, and the area around the tube is sucked into contact with the backing and, being heated and therefore tacky, it is sealed to it.

Figure 2:
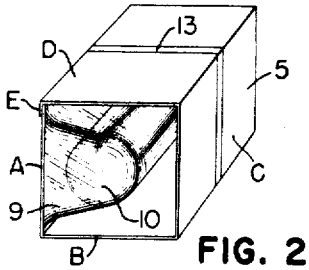
FIGURE 2 is a view in perspective of the finished article.
Figure 3:
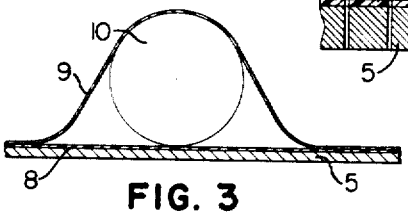
FIGURE 3 is an end view on the line 3—3 of FIGURE 1.
Figure 4:
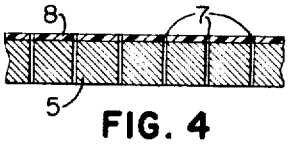
FIGURE 4 is a section on the line 4—4 through the backing of FIGURE 1.

After thus skin-packaging the tube between the film and the backing, the backing is folded into the rectangular package shown in FIGURE 2 and sealed with the adhesive tape 13. If preferred, adhesive may be applied to the flap e, and the tape 13 can then be omitted. Two, three or four tubes may be packaged in this manner, but in that event the cross section of the box must be sufficiently large to accommodate the various tubes. Instead of placing each tube in the center of its panel, it may be placed at one side to economize on the amount of backing required for encompassing the tubes.

FIGURES 5 and 6 illustrate the production of a cylindrical package. The backing 15 is laid out flat. The elongated light bulbs 16 are placed upon it. Then the film 17 is laid over them. The film is heated to soften it and make it stretchable, and vacuum is applied to the undersurface of the backing 15. This backing is perforated and the film is sucked to it.

After the bulbs have been safely held to the backing by heat sealing the film to the backing, all around each of the bulbs, the strip is rolled into a cylinder and the flap 18 at one end of the strip is adhered or otherwise fastened in overlapping relation to the other end of the strip, as illustrated in FIGURE 6. The cylinder may be absolutely rigid, if required. Even though somewhat flexible, it prevents easy collapse of the cylindrical package which would bring one of the bulbs into pressure contact with another bulb, and thus gives added protection over that obtained by the usual skin-package in which the backing does not encompass the packaged article or articles.

FIGURES 7 and 8 illustrate a package of six small, rectilinear, frangible containers 19, one fastened to the inner surface of each of the six panels which are to be formed into a six-sided box. The two extended panels each have flaps 21 on each of their three exposed sides. A single sheet of film 22 covers all six panels. It is heated, and then stretched as it is sucked to the backing 20 all around each individual container. After the containers have been thus fastened in place by adhering the film to the backing, the panel is folded into a box and the flaps 21 are adhered to the adjacent panels. The flaps need not be of the same composition as the backing 20, but they may be part of a cover sheet of paper which is adhered to the outer surface of the box.

FIGURE 8 shows the final package, and by making the backing of rigid material the box may be absolutely rigid so that it is not crushed in shipping or under other circumstances. The skin-packaging prevents any looseness or rattling of any one of the containers 19 within the package.

Figure 9:
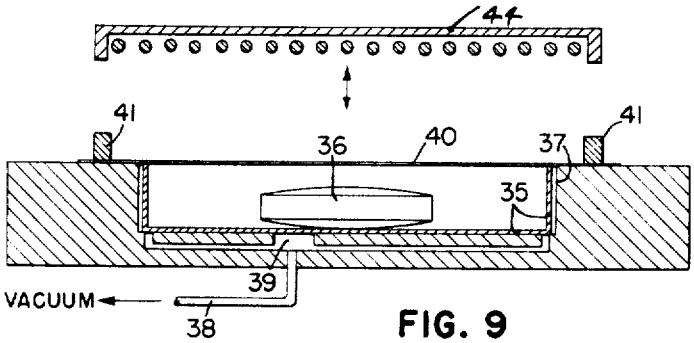
FIGURE 9 is a sectional view illustrating the position of an article in a box on a vacuum plate prior to packaging.
Figure 10:
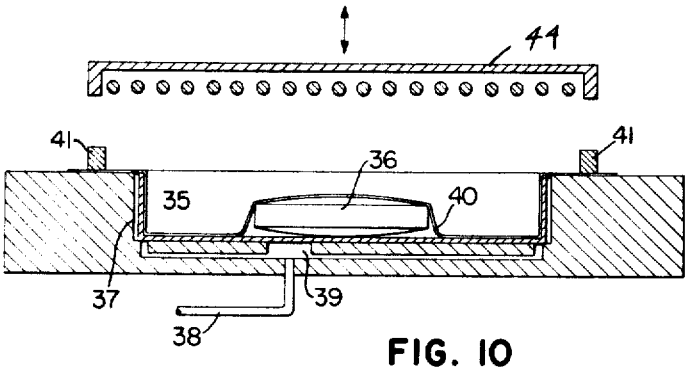
FIGURE 10 is a view of the same with the package in the machine after vacuum has been applied at elevated temperature, with the film drawn down over the article and adhered to the box.

FIGURES 9 and 10 illustrate the use of a preformed box 35, for packaging an article 36. The entire surface of the box may be perforated with small holes, although it may be advantageous to have the walls of the box imperforate. The entire inner surface of the box is covered with a heat-sealable plastic, as is customary in skin-packaging.

The box is placed in an indentation 37 in the surface of the packaging machine. It forms a relatively snug fit in the depression. A vacuum connection 38 is provided which opens into an area 39 which may be larger or smaller and is of a shape best designed to operate efficiently. It must be so located or arranged as to draw the film down into the corners of the box. It may be covered with a grating to support the box, although if the area 39 is relatively small, this is not necessary. It is preferable to have the vacuum hold the edge of the box to the bottom of the depression so that the vacuum does not draw on the area between the wall of the box and the wall of the depression.

The thermoplastic, heat-sealable film 40 is clamped to the surface of the packaging machine around its edge by the clamp 41. Then the film is heated in any suitable manner as by the heating coil 44, or a radiant heater or other heater may be used. Then vacuum is applied to stretch the film down into the box, and it is heat sealed to the inner surface of the walls of the box, and to the bottom of the box around the article to be packaged. On completion of the operation, the article is held to the bottom of the box.

Figure 11:
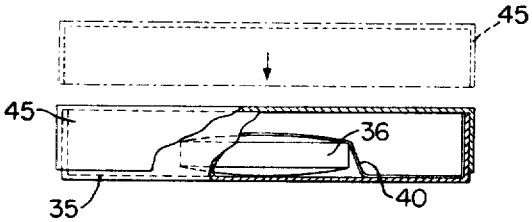
FIGURE 11 is a view of the finished package with a cover on the box with the article held on the bottom of the box by the film.

FIGURE 11 shows the finished package in which the cover 45 is placed over the box 35 which contains the article 36 held in place on the bottom of the box by the film 40.

Figure 12:
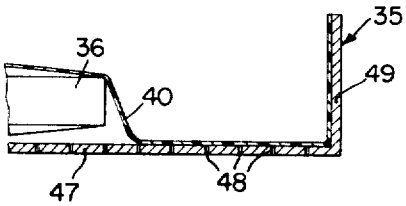
FIGURE 12 is a sectional detail of a corner of the box with a perforate bottom and imperforate wall, covered by film.

FIGURE 12 shows the corner of a box with a bottom 47, perforated with openings 48, and an imperforate wall 49, covered by film 40.

The drawings and description are illustrative. The invention is covered in the claims which follow.

What I claim is:

1. A skin package including an article and a article and a container *enclosure* of stiff material which gives shape to the *package* [container], *said* [the] container *enclosure* having a wall of said stiff material which encloses the article, the article being skin-packaged between (1) thermostretchable and heat-sealable film and (2) a stiff portion of the container *enclosure*, the film being stretched over the article and adhered to said portion of the container *enclosure* on all sides of the article, the area of said portion of the container *enclosure covered by the film* [adjacent the articles and that to which the film is adhered being perforated with spaced fine perforations] *being porous.*

2. The package of claim 1 in which there are a plurality of articles between the film and said portion of the container *enclosure* and the film is adhered to that portion of the container *enclosure* all around each individual article.

3. The package of claim 1 in which only a portion of the container *enclosure* encompasses the article and extensions thereof extend across the areas defined by the edges of said encompassment.

4. The package of claim 1 in which the container *enclosure* includes a cylindrical portion which encompasses said article.

5. The package of claim 1 in which there are a plurality of articles, and the articles are between the film and a cylindrical portion of the container *enclosure* which encompasses the *articles.*

6. The package of claim 1 in which there are a plurality of articles between the film and the container

*enclosure,* and the container *enclosure* includes a rectangular [frame] *panel* with the film covering substantially the entire inner surface of said [frame] *panel,* with at least one article held to each of the four sides of the rectangle by a portion of the film which is stretched over the article and adhered to the [backing] *panel* all around the article.

7. The container *enclosure* of claim 1 which is a box with six *porous* sides [having spaced fine perforations therethrough], with an article adjacent the inner surface of each side, and a single thermostretchable and heat-sealable film covering all of the articles and adhered to the container *enclosure* all around each individual article.

8. The container *enclosure* of claim 1 which is a box with a *porous* bottom [having spaced fine perforations therethrough] and integral walls rising from the bottom, all made from a single sheet of stiff backing material, at least one article on the bottom of the box with thermostretchable and heat-sealable film stretched over the article and adhered to the bottom of the box around the article and also adhered to the inner surface of the walls of the box.

References Cited

The following references, cited by the Examiner, are of record in the patented file of this patent or the original patent.

UNITED STATES PATENTS

| | | | |
|---|---|---|---|
| 2,328,798 | 9/1943 | Gardner | 229—14 |
| 2,669,380 | 2/1954 | Grenier | 229—15 |
| 2,861,404 | 11/1958 | Stratton | 206—78 |
| 2,876,899 | 3/1959 | Maynard | 206—80 |
| 3,011,629 | 12/1961 | Rohdin | 206—78 |
| 3,011,632 | 12/1961 | High | 206—56 |
| 3,090,484 | 5/1963 | Scholl | 206—80 |
| 3,124,241 | 3/1964 | Holley et al. | 206—56 |
| 3,153,505 | 10/1964 | Bessett | 229—43 |
| 2,861,405 | 11/1958 | Hanford | 53—22 |
| 2,874,826 | 2/1959 | Matthews et al. | 206—1 |

FOREIGN PATENTS

| | | |
|---|---|---|
| 784,503 | 10/1957 | Great Britain. |
| 1,152,475 | 9/1957 | France. |

WILLIAM T. DIXSON, JR., *Primary Examiner.*

UNITED STATES PATENT OFFICE

CERTIFICATE OF CORRECTION

Patent No. RE. 26,494 Dated December 3, 1968

Inventor(s) Carl B. Stoker, Jr.

It is certified that error appears in the above-identified patent and that said Letters Patent are hereby corrected as shown below:

Claim 1, line 1 is corrected to read:

-- 1. A skin package including an article --.

Signed and sealed this 18th day of April 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334